F. A. POCOCK.
WATER GAGE.
APPLICATION FILED JUNE 22, 1914.
1,227,196.
Patented May 22, 1917.
2 SHEETS—SHEET 2.
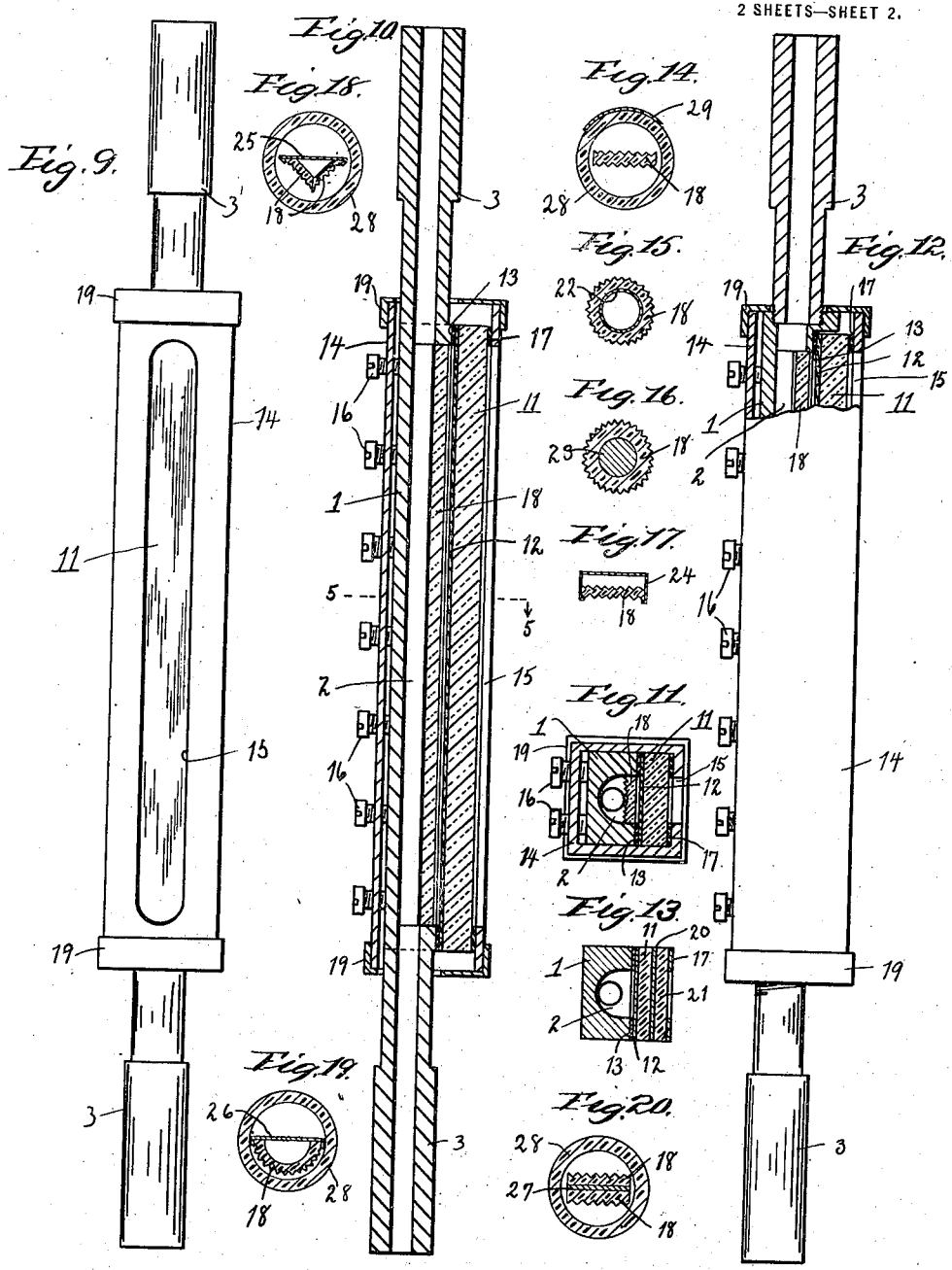
Witnesses
C. Williamson
H. W. Burton
Inventor
F. A. Pocock
By W. W. Williamson
Attorneys

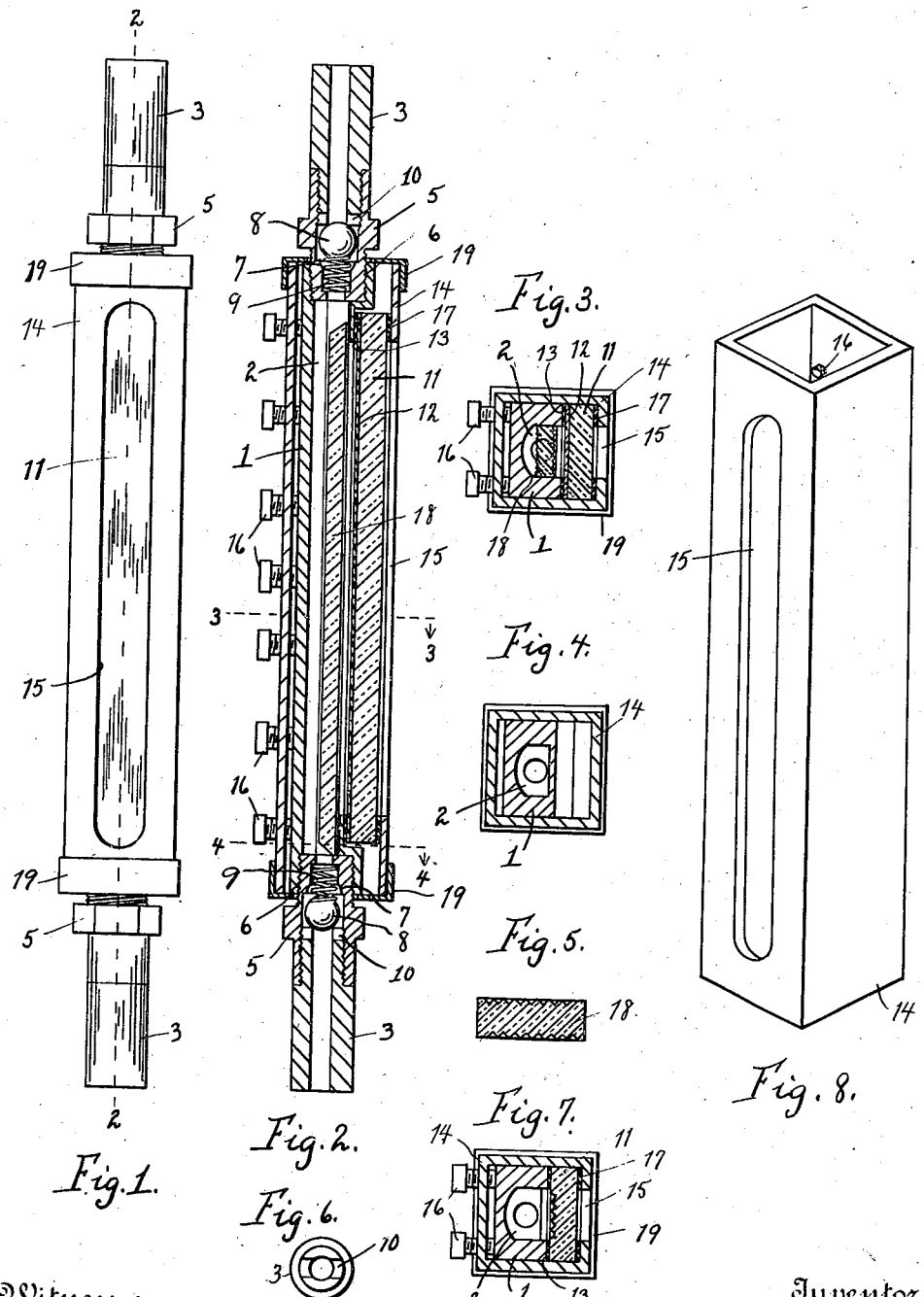

UNITED STATES PATENT OFFICE.

FRANCIS A. POCOCK, OF PHILADELPHIA, PENNSYLVANIA.

WATER-GAGE.

1,227,196.

Specification of Letters Patent.   Patented May 22, 1917.

Application filed June 22, 1914.   Serial No. 846,456.

*To all whom it may concern:*

Be it known that I, FRANCIS A. POCOCK, a citizen of the United States, residing at Philadelphia, in the county of Philadelphia and State of Pennsylvania, have invented new and useful Improvements in Water-Gages, of which the following is a specification.

My invention relates to new and useful improvements in water gages, and has for its object to provide an exceedingly simple and effective construction of such a gage as to produce a pronounced water line.

A further object of the invention is to so inclose the gage in a casing as to prevent injury to the attendant should any part of the gage burst.

A still further object of the invention is to provide means for automatically shutting off the flow of the steam and water to the body of the gage should the glass front break, and a still further object of my invention is to protect the sight glass against the action of the water and steam, especially the latter which has a tendency to eat away the inner surface of the glass, causing leakage and necessitating the renewal of such glass.

With these ends in view this invention consists in the details of construction and combination of elements hereinafter set forth and then specifically designated by the claims.

In order that those skilled in the art to which this invention appertains may understand how to make and use the same, I will describe its construction in detail, referring by numeral to the accompanying drawing forming a part of this specification, in which—

Figure 1, is a front elevation of a water gage made in accordance with my improvement.

Fig. 2, is a section at the line 2—2 of Fig. 1.

Fig. 3, is a section at the line 3—3 of Fig. 2.

Fig. 4, is a section at the line 4—4 of Fig. 2.

Fig. 5, is an enlarged cross section of the internal reflex glass.

Fig. 6, is an inner end view of one of the nipples showing the cross slot therein for permitting the steam or water to pass around the ball valves.

Fig. 7, is a section similar to Fig. 3, showing the sight glass as being of the ordinary reflex type.

Fig. 8, is a perspective view of the casing which incloses the gage.

Fig. 9, is a front view of a slightly modified form of my construction in which the nipples are cast with the body of the gage.

Fig. 10, is a central vertical section of Fig. 9.

Fig. 11, is a section at the line 5—5 of Fig. 10.

Fig. 12, is a still further modification of the construction in which the automatic shut-off ball valves are omitted.

Fig. 13, is a section similar to Fig. 11 showing a laminated transparent member for the front of the gage which consists of alternate sections of mica and glass.

Fig. 14, is a section of an ordinary glass tube embodying my improved reflex device.

Fig. 15, is a section of one form of the reflex element.

Fig. 16, is a cross section of a slight modification of the reflex elements shown in Fig. 15.

Fig. 17, is a section of a further modification of the reflex element.

Fig. 18, is a further modification of the reflex element.

Fig. 19, shows a further modification of the reflex element; and

Fig. 20, shows a still further modification of the reflex element.

In carrying out my invention as here embodied in Figs. 1 to 8 inclusive, 1 represents the body of the gage which has a longitudinal recess 2 therein which recess is open on the face of the gage and is for holding the water and steam which is supplied thereto through the nipples 3. Each of the nipples is threaded into a bushing 5 which latter in turn are threaded into the ends of the body as indicated at 6.

Within each of the bushings is formed a valve seat 7 upon which a ball valve 8 is adapted to close and this ball valve is normally held off of its seat by the spring 9, the ball valve being limited in its movement by the inner end of the nipple 3 which is slotted as indicated at 10 to permit the steam or water to pass around the ball valve when off its seat.

The recess 2 is closed by the sight glass 11 upon the inner face of which is a sheet of mica 12 between which and the face of the gage lies the packing or gasket 13 by which a steam tight joint is made between the mica and the face of the gage.

14 represents the casing which I prefer to make of cold drawn steel in order that it may have relatively great strength, and this casing has a longitudinal slot 15 in the front face thereof, and is provided with a double row of set screws 16 upon the back thereof.

By this arrangement when the sight glass is placed in position upon the face of the gage the casing is slipped over the gage and glass so as to entirely inclose the same when by setting up the screws 16 the face of the casing will be drawn firmly against the outer surface of the glass or the packing 17 interposed therebetween, thereby making a steam tight joint between the sheet of mica and the face of the gage.

As the slot 15 in the casing is in alinement with the longitudinal recess in the body of the gage the water in the gage will be visible through the sight glass.

In order that the water in the gage may be made prominent to the eye, I insert a reflex glass 18 within the recess 2 of the body of the gage and enamel or otherwise blacken the inner surface of the recess so that the water will appear black but the reflex glass above the water line will present a bright silver effect, and I have found by experiment that when both surfaces of this glass are grooved to produce the reflex effect as shown in Fig. 5, the contrast between the water and steam is intensified, the reason being that the portion of the reflex glass which is below the water line, permits the free passage of light, thus showing the black background, while the portion thereof which is above the water line does not permit the passage of the light, and where both surfaces are corrugated, this reflex action is increased, and the glass throws off a bright silver appearance.

As before stated the ball valves 8 are normally held off their seats by a spring 9, but should the sight glass break or crack sufficiently to leak, the unbalancing of the pressure in the recess of the gage and the boiler will cause an inflow of the water and steam, and upon the first movement of the water and steam, the ball valves will be firmly closed against their seats, thus shutting off such inflow and preventing the scalding of the attendant. As soon as boiler pressure is shut off by the ball valves or otherwise, the spring 9 will return the ball valves to their normal open positions.

In Figs. 9, 10 and 11, I have shown a slightly modified form of the above described construction, in that the nipples 3 are formed with the body 1 and the reflex glass 18 is set in the recess from the open face thereof, while in the first described construction this reflex glass may be inserted in the recess through the holes in which the bushings are threaded before the latter are screwed in place.

In Fig. 12 I have shown the nipples 3 as being threaded directly into the ends of the body of the gage instead of into the bushings, which are in turn threaded into the body as before described. If found desirable the ends of the casing may be closed by the caps 19, and these caps may be used as name plates.

The modification of the transparent element for the front of the gage shown in Fig. 13 consists of a sheet of mica 12, a thick glass 11, another sheet of mica 20, and another thick glass 21, all arranged in a pile which arrangement gives strength and protection to each member of the pile.

In Fig. 14 I have shown the reflex element 18 placed within a glass gage tube 28, said gage having a section thereof provided with a black background as indicated at 29, and this black background may be blown in the glass or applied thereto as desired, and in connection with the reflex element 18 will cause the water in the tube to appear black, while the steam space will appear white or silver. Of course the background may be any prominent color instead of black, the water appearing the color of this background.

In Fig. 15 I have shown the reflex element 18 in the form of a tube, the outer surface of which is cut or molded to produce the reflex effect, while the inner surface has applied thereto or formed therewith a black background as indicated at 22. This form of reflex element when placed in a round gage tube will give the water the appearance of the color of the background from any position at which the gage may be viewed.

In Fig. 16 I have shown the reflex element 18 as consisting of a solid rod, the surface of which is cut or molded to give the reflex effect, while a core of black or any desired color is formed through the center thereof as indicated at 23.

In Fig. 17 I have shown the reflex element 18 in the form of a glass having its surfaces cut or molded to produce the reflex effect, and to this element is secured a channel shaped element 24 which forms the background and leaves a space between said background and the reflex element, which in practice I have found intensifies the effect upon the water.

In Fig. 18 I have utilized the same principle as that shown in Fig. 17, but I provide two reflex elements 18 set at an angle to each other, having a background 25 attached thereto in such manner as to leave a space between the back of the elements and the background.

In Fig. 19 I have shown a slight modification of the reflex elements shown in Fig. 18, in which this reflex element 18 is semi-circular, having the background 26 attached thereto.

In Fig. 20 I have shown two reflex elements 18 set back to back with a background section 27 interposed therebetween.

Of course I do not wish to be limited to the exact details of construction as herein shown, as these may be varied within the limits of the appended claims without departing from the spirit of my invention.

Having thus fully described my invention, what I claim as new and useful, is—

1. In a device of the character stated a slotted casing, a recessed body provided with bushings carrying nipples, and removably contained within said casing, a transparent member lying between the body and one of the walls of the casing, means carried by the casing for holding the parts together, and caps frictionally engaging the ends of the casing for closing the same.

2. A water gage comprising a slotted casing, a recessed body removably contained within said casing, a transparent member lying between the casing and body, means carried by the casing for holding the parts together, a bushing carried by each end of the body, each of said bushings being provided with a valve seat and acting as a housing for a valve, a ball valve situated within each of said bushings, a nipple threaded in each of said bushings for limiting the outward movement of the ball valve and means for normally holding said ball valves unseated.

3. A water gage comprising a slotted casing, a recessed body removably contained within said casing, a transparent member lying between the casing and body, means carried by the casing for holding the parts together, a bushing carried by each end of the body, each of said bushings being provided with a valve seat and acting as a housing for a valve, a ball valve situated within each of said bushings, a nipple threaded in each of said bushings, the inner end of said nipples being slotted transversely, and means for normally holding the ball valve unseated and against the inner ends of said nipples.

4. A water gage comprising a slotted casing, a recessed body removably contained within said casing, a transparent member lying between the casing and body, means carried by the casing for holding the parts together, a bushing carried by each end of the body, each of said bushings being provided with a valve seat and acting as a housing for a valve, a ball valve situated within each of said bushings, a nipple threaded in each of said bushings, the inner end of said nipples being slotted transversely, and a spring situated within each of the bushings and engaging the ball valve for normally holding the latter unseated and in contact with the slotted ends of the nipples.

5. A water gage comprising a rectangular casing provided with a slot in one of its sides, a recessed body situated within said casing with the recess toward the slot, a sight glass situated between the body and the slotted side of the casing and disposed across the recess and slot, set screws passing through the wall of the casing opposite the slot and arranged to engage the back of the body for holding the parts in position, bushings carried by the ends of the body, each of said bushings having a valve seat and a spring chamber therein, said valve seats being situated toward the inner ends of the bushings a ball valve within each of the bushings, springs for normally forcing said valves outward away from their seats and nipples threaded in said bushings, the inner ends of said nipples limiting the movements of the ball valves.

6. A water gage comprising a rectangular casing provided with a slot in one of its sides, a recessed body situated within said casing with the recess toward the slot, a sight glass situated between the body and the slotted side of the casing and disposed across the recess and slot, set screws passing through a wall of the casing opposite the slot and arranged to engage the back of the body for holding the parts in position, closures frictionally engaging the ends of the casing for closing the same, bushings removably attached to the body and passing through said closures, each of said bushings having an internal valve seat, a ball valve situated within each of the bushings, a spring also situated within each of the bushings, for normally holding said ball valves unseated, and nipples carried by said bushings.

7. A water gage comprising a rectangular casing provided with a slot in one of its sides, a recessed body situated within said casing with the recess toward the slot, a sight glass situated between the body and the slotted side of the casing and disposed across the recess and slot, set screws passing through the wall of the casing opposite the slot and arranged to engage the back of the body for holding the parts in position, closures frictionally engaging the ends of the casing for closing the same, bushings removably attached to the body and passing through said closures, each of said bushings having an internal valve seat, a ball valve situated within each of the bushings, a spring also situated within each of the bushings for normally holding said ball valves unseated, and a nipple threaded in each of said bushings, the inner ends of said nipples being slotted transversely as shown and for the purpose described.

In testimony whereof, I have hereunto affixed my signature in the presence of two subscribing witnesses.

FRANCIS A. POCOCK.

Witnesses:
M. E. HAMER,
M. TOBIAS.